United States Patent [19]

Nakano

[11] Patent Number: 5,362,590
[45] Date of Patent: Nov. 8, 1994

[54] LASER-SENSITIVE ELECTROPHOTOGRAPHIC LITHOGRAPH PRINTING PLATE MATERIAL

[75] Inventor: Shiro Nakano, Nichinan, Japan

[73] Assignee: Oji Paper Co., Ltd., Chuo, Japan

[21] Appl. No.: 928,755

[22] Filed: Aug. 13, 1992

[30] Foreign Application Priority Data

Sep. 9, 1991 [JP] Japan .................................. 3-228915

[51] Int. Cl.$^5$ ............................................. G03G 5/09
[52] U.S. Cl. .............................. 430/89; 430/93
[58] Field of Search ...................... 430/93, 78, 83, 89

[56] References Cited

U.S. PATENT DOCUMENTS

| | | | |
|---|---|---|---|
| 4,362,800 | 12/1982 | Takimoto et al. | 430/83 |
| 4,418,135 | 11/1983 | Beeson et al. | 430/93 |
| 4,563,408 | 1/1986 | Lin et al. | 430/59 |
| 4,681,827 | 7/1987 | Franke et al. | 430/83 |
| 4,879,195 | 11/1989 | Toyofuku et al. | 430/89 |
| 4,929,527 | 5/1990 | Kato et al. | 430/93 |
| 5,096,793 | 3/1992 | Osawa et al. | 430/66 |

FOREIGN PATENT DOCUMENTS

| | | |
|---|---|---|
| 0321284 | 6/1989 | European Pat. Off. |
| 0430597A2 | 6/1991 | European Pat. Off. |
| 3625766A1 | 2/1987 | Germany |

OTHER PUBLICATIONS

Patent Abstracts of Japan, vol. 006, No. 005, Jan. 13, 1982 & JP-A-56 130 759.

Patent Abstracts of Japan, vol. 13, No. 540, Dec. 5, 1989 & JP-A-12 22 266.

*Primary Examiner*—Christopher D. Rodee
*Attorney, Agent, or Firm*—Armstrong, Westerman, Hattori, McLelland & Naughton

[57] ABSTRACT

A laser-sensitive electrophotographic lithograph printing plate material having excellent sensitivity to light having a long wavelength of from 700 to 1000 nm, a high thermal resistance and persistency, and high resistance to a change of sensitivity with time, provided with a laser-sensitive photoconductive layer formed on a substrate and comprising a photoconductive pigment; a sensitizing dye comprising at least one compound of the formula (I):

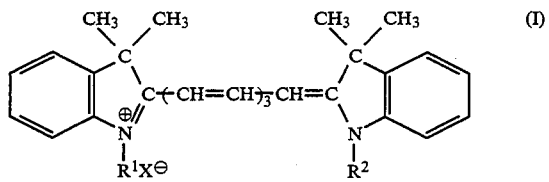

wherein $R^1$ and $R^2$ are respectively —$CH_3$, —$C_2H_5$, or —$CH_2$—$CH$=$CH_2$ and X is a halogen atom, an antioxidant comprising at least one member selected from radical chain terminators, peroxide-decomposing agents, and heavy metal-deactivating agents, and an electrically insulating binder.

6 Claims, No Drawings

LASER-SENSITIVE ELECTROPHOTOGRAPHIC LITHOGRAPH PRINTING PLATE MATERIAL

BACKGROUND OF THE INVENTION

1. Field of the Invention

The present invention relates to a laser-sensitive electrophotographic lithograph printing plate material. More particularly, the present invention relates to a laser-sensitive electrophotographic lithograph printing plate material having an enhanced spectral sensitivity to semiconductor laser rays.

2. Description of the Related Art

Due to recent progress and development of small-size offset printing machines and automatic printing mechanisms, the emphasis in light printing process is now shifting to the offset printing process.

There is much research and development going on regarding offset printing plate materials, and, as a result, various improved printing plate materials are now being commercially used.

Among the conventional offset printing plate materials, an electrophotographic lithograph printing plate material having a photosensitive electrophotographic layer wherein electroconductive zinc oxide particles are dispersed as a main photoconductive material is most widely employed in the light printing industry, because it is cheap and because the process for making the printing plate from the plate material is simple and easy.

In a conventional process for producing an electrophotographic lithograph printing plate, the printing plate material is subjected to a corona charging step, an imagewise light exposing step, a developing step, and a fixing step by using a printing plate-making machine, to form visible images in the desired pattern on the photoconductive layer.

The developing step can be effected by either a dry developing method in which a mixture of a toner and a carrier consisting of an iron powder is used as a dry developing agent, or a wet developing method in which a developing liquid containing a toner dispersed in an organic solvent, for example, a petroleum solvent with a high boiling point, is used.

The wet developing method for the preparation of the printing plate is advantageous in that the reproducibility of half-tone images is high, the resolving power is excellent, the plate-making time is short, and no correction is necessary for the formed images. Therefore, the wet developing method is widely utilized for the production of electrophotographic lithograph printing plates.

In such electrophotographic lithograph printing plates, the photoconductive zinc oxide particles used as a photoconductive pigment are photosensitive only at a wavelength of about 370 nm in the ultraviolet band. Therefore in the conventional electrophotographic lithograph printing plate and offset master in which the photoconductive zinc oxide is utilized as a photoconductive pigment, it is necessary to broaden the photosensitive wavelength band of the photoconductive layer so that it conforms to the wavelength band of an exposure light source. For this purpose, many attempts have been made to add a sensitizing dye, for example, rose benzol, uranin, bromophenolphenol (BPB) or Nigrosine, to the photoconductive layer. These have been widely utilized commercially.

Generally, in a conventional printing plate-making machine, a manuscript is exposed to light irradiated from an exposure light source, for example, a halogen lamp, the reflected light from the manuscript is irradiated to a corona-charged photoconductive layer of a printing plate material, and then the light-exposed photoconductive layer is subjected to developing and drying procedures, to provide a printing plate.

Due to the recent development of various recording machines and the spread of data digitalization, a computer-to-plate type printing plate-making method is now widely utilized for the electrophotographic material. In this method, the data in the computer is edited on a CRT and the edited data is directly applied to an electrophotographic material without preparing a hard copy, to provide a printing plate.

This development of the new printing plate-making technology is promoted by the progress of laser ray technology. Particularly, a semiconductor laser is advantageous in that the laser rays can be generated in a small device at a low cost and can be directly modulated.

Recently, due to the above-mentioned advantages, a new printing plate-making system utilizing semiconductor laser rays has been developed.

The electrophotographic printing plate material usable for the laser rays must have high sensitivity at a long wavelength band of 700 to 1000 nm. Electrophotographic materials sensitive at a wavelength band of semiconductor laser rays are disclosed, for example, in U.S. Pat. Nos. 4,362,800 and 4,418,135.

The above-mentioned electrophotographic materials containing photoconductive zinc oxide are provided with a photoconductive layer spectrosensitized with a sensitizing dye, for example, a polymethine type cyanine dye, and have enhanced sensitivity at the long wavelength band.

Nevertheless, in conventional electrophotographic materials in which only the sensitizing dye is added to the photoconductive layer, the sensitivity thereof is not satisfactory in commercial use.

To enhance the sensitivity of the photoconductive layer, an attempt has been made to use a sensitizing assistant in addition to the sensitizing dye.

For example, U.S. Pat. No. 4,879,195 discloses employment of a polymethine type cyanine dye having an alkylsulfonic acid group as an N-substituent of each of the cyclic dimethylindole groups located in the two terminals of the dye molecule, together with a sensitizing assistant consisting of maleic anhydride.

The laser-sensitive lithograph printing plate material containing the sensitizing dye and the sensitizing assistant is disadvantageous in that the heat resistance of the printing plate material is poor.

The heat resistance of the printing plate material refers to a resistance of the printing plate material against a reduction in sensitivity thereof when the temperature of the printing plate material is raised.

This high heat resistance is an important property of a printing plate material, which must exhibit high durability over a long time and high stability in storage and transportation thereof.

SUMMARY OF THE INVENTION

An object of the present invention is to provide an electrophotographic lithograph printing plate material having high photosensitivity to long wavelength laser rays with a wavelength of from 700 to 1000 nm.

Another object of the present invention is to provide an electrophotographic lithograph printing plate material having high heat resistance, high durability in storage and transportation, and high resistance to deterioration in sensitivity with the elapse of time.

The above-mentioned objects can be attained by the electrophotographic lithograph printing plate material of the present invention, which comprises a substrate and a laser-sensitive photoconductive layer formed on a surface of the substrate and comprising a mixture of a photoconductive pigment and an electrically insulating binder; the photoconductive layer further comprising (1) a sensitizing dye comprising at least one compound of the formula (I):

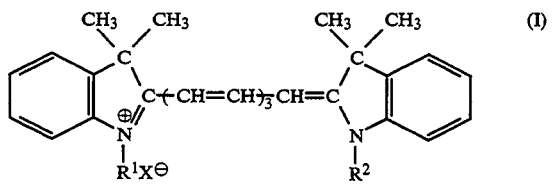

wherein $R^1$ and $R^2$ respectively and independently from each other represent a member selected from the group consisting of $-CH_3$, $-C_2H_5$, and $-CH_2-CH=CH_2$ groups and X represents a halogen atom, and (2) an antioxidant comprising at least one member selected from the group consisting of radical chain terminators, peroxide-decomposing agents, and heavy metal-deactivating agents.

DESCRIPTION OF THE PREFERRED EMBODIMENTS

In the electrophotographic lithograph printing plate material of the present invention, a laser-sensitive photoconductive formed on a substrate that is electroconductive and water-resistant comprises (1) a specific sensitizing dye and (2) a specific antioxidant in addition to a mixture of a photoconductive pigment and an electrically insulating binder.

The sensitizing dye usable for the present invention comprises at least one cyanine dye compound of the formula (I).

The cyanine dye compound of the formula (I) has high solubility and advantageously causes the resultant photoconductive layer to exhibit a small dark decay and high spectrosensitivity.

The photoconductive pigment comprises at least one member selected from the group consisting of photoconductive zinc oxide, and titanium dioxide, preferably finely divided photoconductive zinc oxide.

Preferably, the photoconductive pigment is present in an amount of 70% to 85% in the photoconductive layer.

The sensitizing dye compound of the formula (I) is preferably present in an amount of from 0.001 to 0.5%, more preferably 0.01 to 0.2%, based on the weight of the photoconductive pigment, in the photoconductive layer.

In the present invention, the sensitivity of the photoconductive layer can be significantly stabilized by adding a specific antioxidant to the photoconductive layer containing the sensitizing cyanine dye compound of the formula (I).

The mechanism by which the sensitivity of the photoconductive layer is stabilized by the addition of the antioxidant has not yet been made fully clear. However, it is assumed that radicals generated from polymeric materials in the photoconductive layer upon heating are caught by the antioxidant to stabilize the sensitizing cyanine dye compound of the formula (I). Usually, various types of antioxidants are added to customary plastic resins, for example, polyethylene, polypropylene, polystyrene, polyacrylonitrile, and polyvinyl chloride resins when they are thermally melted and molded, to prevent discoloration and a reduction in mechanical strength thereof due to the influence of heat, light, and oxygen.

Separately, the photoconductive layer of the electrophotographic lithograph printing plate material comprises a binder for the photoconductive pigment. Usually, the binder comprises an acrylic resin that has excellent electric properties. The acrylic resin is usually prepared by a solution polymerization method and employed in the state of a solution in a solvent to form a coating layer on a substrate. The acrylic resin solution layer on the substrate is solidified by evaporating away the solvent by using a dryer, to form a solid coating layer.

In the formation of the acrylic resin coating layer, the acrylic resin per se is not melted and shaped at a high temperature, and thus oxidation of the acrylic resin does not occur, while the above-mentioned customary plastic resins are oxidized in the melt-molding procedure. Accordingly, it is unnecessary to add an antioxidant to the acrylic resin to be employed as a binder in the photoconductive layer.

Generally, the antioxidant is used to prevent the occurrence and progression of deterioration of a polymeric material.

The antioxidant has the following activities.

(a) Radical chain-inhibiting activity

The radicals generated in the polymeric material are caught by the antioxidant to inhibit the radical chain reaction.

(b) Peroxide-decomposing activity

The peroxides produced from the polymeric material are decomposed by the antioxidant.

(c) Heavy metal-deactivating activity

The heavy metals present in the polymeric material are deactivated by the antioxidant.

Usually, a reactant having at least one of the activities (a), (b), and (c) is referred to as an antioxidant.

Where an antioxidant is mixed in a polymeric material, the antioxidant is required to have the following properties:

(1) A high compatibility with the polymeric material
(2) A low volatility
(3) Nontoxicness
(4) High chemical and thermal stability The radical chain-terminators usable as the antioxidant for the present invention are preferably selected from the group consisting of 2,6-di-tert-butyl-p-cresol (BHT), and 2,2'-methylene-bis (4-methyl-6-tert-butylphenol) (MDP).

The peroxide-decomposing agents usable as the antioxidant for the present invention are preferably selected from the group consisting of dilaurylthiodipropionate and nonylphenylphosphite.

The hearty metal-deactivating agent usable as the antioxidant for the present invention is preferably N-phenylnaphthylamine.

In the electrophotographic lithograph printing plate material of the present invention, the antioxidant is preferably present in an amount of 0.001 to 0.5% based on the weight of the photoconductive pigment in the photoconductive layer.

In the preparation of the photoconductive layer, preferably, a coating liquid comprising a photoconductive pigment, for example, zinc oxide or titanium dioxide, an electrically insulating binder, a sensitizing dye, an antioxidant, and a solvent is applied to a surface of a substrate, or to a surface of an intermediate layer formed on the substrate, and the resultant coating liquid layer is solidified by drying.

Usually, the electrically insulating binder usable for the photoconductive layer of the present invention comprises at least one hydrophilic polymeric material selected from the group consisting of acrylic acid ester copolymers, methacrylic acid ester copolymers, vinyl acetate copolymers, silicone resins, and polyvinyl butyral resins. The hydrophilic binder resins effectively prevent a ground stain of the printing plate in the printing step. Usually, the ground stain-preventing resins are prepared by copolymerizing comonomers having a functional group, for example, acrylic acid, methacrylic acid, or maleic acid, to improve the quality of images, the coating property of the coating liquid, and the mechanical strength of the coated layer.

Preferably, the binder resin is present in a dry solid amount of 10 to 30%, more preferably 15 to 25%, based on the weight of the photoconductive pigment, in the photoconductive layer.

The substrate of the printing plate material of the present invention is electroconductive and water-resistant and comprises at least one member selected from electroconductive, water-resistant paper sheets, laminate sheets comprising a paper sheet, and an aluminum foil or a polyethylene film, plastic films, metal-deposited paper sheets, and synthetic paper sheets.

Usually, the substrate has a thickness of 100 to 170 μm.

Generally, the long time storage durability and stability in sensitivity of the photoconductive layer during transportation are determined and evaluated by an accelerated deteriorating test at a temperature of 60° C. for 96 hours. In this test, the difference in sensitivity between the initial specimen and the heat-deteriorated specimen of the lithograph printing plate material is measured, and the smaller the difference in sensitivity, the higher the stability in the sensitivity of the lithograph printing plate material.

The printing plate material of the present invention is optionally provided with a back coating layer formed on an opposite surface of the substrate from the photoconductive layer. This back coating layer effectively prevents curling of the printing plate during an etching step and penetration of a toner to the inside of the printing plate during a wet developing step.

In the printing plate material of the present invention, an intermediate layer is preferably formed between the substrate and the photoconductive layer, to enhance the water resistance of the resultant printing plate.

The intermediate layer is usually prepared from a film forming polymeric material comprising at least one member selected from water soluble polymeric materials, for example, polyvinyl alcohol resins, casein, and starch, and hydrophobic resin emulsions, for example, acrylic acid ester copolymers, urethane-acrylic acid ester copolymers, and SBR resin emulsions; and a water-resisting agent, for example, melamine-formaldehyde resin, glyoxal, and silane coupling agents. Usually, the intermediate layer has a weight of from 5 to 10 $g/m^2$.

The lithograph printing plate material of the present invention provided with an intermediate layer is produced by coating a front surface of a substrate with a coating liquid containing the polymeric material and the water-resisting agent as mentioned above and a solvent, drying the coating liquid layer to form an intermediate layer, coating the intermediate layer surface with a coating liquid comprising an electroconductive pigment, a binder, a sensitizing dye, and antioxidant, and a solvent, for example, ethyl acetate, butyl acetate, toluene, or xylene, drying the resultant coating liquid layer to form a photoconductive layer, and optionally coating a back surface of the substrate with a coating liquid comprising, for example, a pigment, a binder and an antistatic agent.

In the lithograph printing plate material of the present invention, a barrier layer comprising, as the main component thereof, a water-soluble polymeric material, for example, polyvinyl alcohol, casein, or starch is optionally arranged between the substrate and the intermediate layer. The barrier layer is an effective barrier against an organic solvent. Preferably, the barrier layer has a weight of 1 to 2 $g/m^2$.

EXAMPLES

The specific examples presented below will more fully elaborate the ways in which the present invention can be practically used. It should be understood, however, that the examples are only illustrative and in no way limit the scope of the present invention.

Example 1

An electrophotographic lithograph printing plate material was produced by the steps (1) to (4) presented below and converted to a lithograph printing plate by the step (5) mentioned below, and then a specimen of the printing plate was subjected to the testing step (6) as mentioned below.

(1) Coating of barrier layer

A front surface of a paper sheet having a basis weight of 100 $g/m^2$ was coated with a barrier layer consisting of 80% by dry solid weight of polyvinyl alcohol and 20% by dry solid weight of sodium polyacrylate and having a dry weight of 2 $g/m^2$, by a size-press procedure.

(2) Coating of intermediate layer

The surface of the barrier layer on the size-pressed paper sheet having a thickness of 110 μm was coated with an intermediate layer having a weight of 10 $g/m^2$.

The intermediate layer was provided from a coating liquid having the following composition

| Component | Composition Part by weight |
|---|---|
| Muscovite (*)1 | 40 |
| Aqueous polyurethane dispersion (*)2 | 40 |
| Aqueous casein solution (—%) | 10 |
| Silane coupling agent (*)3 | 10 |

Note:
(*)1 Average particle size: 20 μm Trademark: Muscovite A-21, made by Yamaguchi Unmo K.K.
(*)2 Trademark: Azelax S-1071, made by Hodogaya Kagaku K.K.
(*)3 Trademark: SH 6040, made by Toray Silicone K.K.

(3) Coating of back layer

A back surface of the substrate processed in the step (1) and (2) was coated with an electroconductive back layer having a dry weight of 13 g/m².

The back layer was founded from a coating liquid having the following composition.

| Composition | |
|---|---|
| Component | Part by weight |
| Benzoquanamine-formaldehyde resin (*)4 | 5 |
| Aqueous Kaolinite-clay dispersion (*)5 | 5 |
| SBR latex (*)6 | 35 |
| Polyvinyl alcohol (*)7 | 7 |
| Sodium polyacrylate (*)8 | 3 |

Note:
(*)4 Trademark: Eposter L, made by Nihon Shokubai Kagaku Kyogyo K.K.
(*)5 Trademark: HG Clay, made by Huber Co.
(*)6 Trademark: PT-1004, made by Nihon Zeon K.K.
(*)7 Trademark: T-330, made by Nihon Gosei Kagaku K.K.
(*)8 Trademark: Primal 850, made by Nihon Acryl K.K.

The resultant sheet product having the barrier, intermediate, and back layers was surface-smoothed by a super calender treatment so that the surface of the intermediate layer had a Bekk smoothness of 500 seconds.

(4) Coating of photoconductive layer

The smoothed surface of the intermediate layer was coated by a photoconductive layer having a weight of 25 g/m² to provide an electrophotographic lithograph printing plate material.

The photoconductive layer was formed from a coating liquid prepared by the following procedures.

A mixture liquid was prepared with the following composition.

| Composition | |
|---|---|
| Component | Part by weight |
| Photoconductive zinc oxide (*)9 | 100 |
| Acrylic resin (*)10 | 25 |
| Antioxidant (*)11 | |

Note:
(*)9 Trademark: SAZEX #2000, made by Sakai Kagaku K.K.
(*)10 Trademark: LR-188, made by Mitsubishi Rayon K.K.
(*)11 2,6-di-tert-butyl-p-cresol (BHT), made by Kawaguchi Kagaku K.K.

The mixture liquid was admixed with a solution of 0.02 part by weight of a sensitizing dye compound of the formula(I), wherein $R^1$ and $R^2$ respectively represent a —$CH_3$ group and X represents an iodine atom, in 3 parts by weight of methyl alcohol. The admixture was dispersed by using a sand grinder to prepare a coating liquid. The coating liquid was applied to the intermediate layer surface and dried.

(5) Preparation of lithograph printing plate

The resultant printing plate material was conditioned in a dark room at a temperature of 20° C. and at a RH of 65% for 24 hours. The photoconductive layer surface of the conditioned printing plate material was subjected to negative corona charging under a voltage of −6 V, and then was scanned and exposed in accordance with a certain pattern by semiconductor laser rays at a laser ray intensity of 4, 5, or 6 mW, at a wavelength of 780 μm at 430 dpi. The exposed surface was developed by using a positively charged developing liquid toner (made by Iteh Co.), to provide a lithograph printing plate.

(6) Printing performance test

In the printing test procedure, an etching liquid (made by Iteh Co.) was used. Wetting water was prepared by diluting the Iteh etching liquid at a diluting ratio of 10:1. As a printing ink, New Champion F Gloss Black (Trademark) made by Dainippon Ink & Chemicals Inc. was used.

The developed printing plate was set on a printing machine (Trademark: Ryobi 2800 CD) and subjected to a printing process in a customary manner.

The printing performance of the printing plate was evaluated by observing a printing ground stain derived from the toner remaining on the printing plate surface exposed at a laser intensity of 6 mW.

The heat resistance-storage durability of the printing plate material was evaluated by an accelerated deterioration test in which the printing plate material was stored in a closed black colored polyvinyl chloride bay in a drying oven at a temperature of 60° C. for 4 days (96 hours), cooled to room temperature, and then subjected to the same printing plate-making procedure. The printing performance of the resultant printing plate was evaluated in the same manner as mentioned above.

The test results are shown in Table 1.

Example 2

An electrophotographic lithograph printing plate material was produced by the same procedures as in Example 1 except that the photoconductive layer contained an antioxidant consisting of 2,2'-methylene-his (4-methyl-6-tert-butylphenol)(MDP) in an amount of 0.05 parts by weight, in place of the 2,6-di-tert-butyl-p-cresol (BHT).

The test results are shown in Table 1.

Example 3

An electrophotographic lithograph printing plate material was produced by the same procedures as in Example 1 except that the photoconductive layer contained, as the antioxidant, 0.05 part by weight of dilaurylthiodipropionate (DLTDP), in place of the 2,6-di-tert-butyl-p-cresol (BHT).

The test results are shown in Table 1.

Comparative Example 1

An electrophotographic lithograph printing plate material was produced by the same procedures as in Example 1 except that no antioxidant was contained in the photoconductive layer.

The test results are shown in Table 1.

Comparative Example 2

An electrophotographic lithograph printing plate material was produced by the same procedures as in Example 1 except that the sensitizing dye in the photoconductive layer consisted of the compound of the formula:

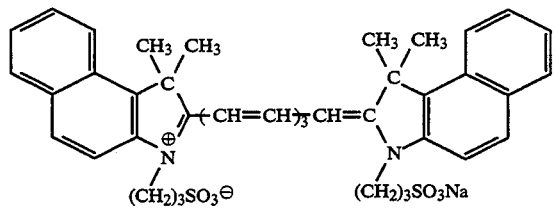

The test results are shown in Table 1.

TABLE 1

| | Original printing plate (*)$_{12}$ Toner density | | Accelerated deterioration treatment (60° C. × 96 hrs.) | | | |
|---|---|---|---|---|---|---|
| | | | Toner density (*)$_{12}$ | | Resistance of printing plate to fogging (*)$_{13}$ | Resistant to printing stain (*)$_{14}$ |
| | Image portion | Non-image portion | Image portion | Non-image portion | | |
| Ex. 1 | 1.02 | 0.15 | 1.02 | 0.16 | 3 | 3 |
| Ex. 2 | 1.03 | 0.14 | 1.02 | 0.14 | 3 | 3 |
| Ex. 3 | 1.02 | 0.13 | 1.03 | 0.18 | 3 | 3 |
| Comp. Ex. 1 | 1.02 | 0.14 | 1.03 | 0.43 | 2–1 | 2–1 |
| Comp. Ex. 2 | 1.06 | 0.38 | 1.04 | 0.40 | 2–1 | 2–1 |

Note:
(*)$_{12}$ The toner density in each portion of the developed plate was measured by a Macbeth Color density meter (type RD-914, made by Kollmorgen Corp.)
(*)$_{13}$ 3 . . . Good 2 . . . Slightly bad 1 . . . Bad
The evaluation was made by visual observation.
(*)$_{14}$ 3 . . . No stain was found. 2 . . . Slight stain was found. 1 . . . Significant stain was found.

The evaluation was made by visual observation.

As Table 1 clearly shows, the electrophotographic lithograph printing plate materials of Examples 1 to 3 in accordance with the present invention exhibited a satisfactorily high stability in sensitivity even after the accelerated deterioration treatment and had a high resistance to printing stain.

In Comparative Example 1, however, the printing plate material exhibited a significantly poor stability in sensitivity after the accelerated deterioration treatment, while the original printing plate material exhibited a satisfactory stability. Also, this printing plate material was unsatisfactory in its resistance to fogging and its resistance to printing stain.

In Comparative Example 2, the resultant printing plate material exhibited a poor stability in sensitivity even before the accelerated deterioration treatment, and had unsatisfactory resistances to fogging and to printing stain.

The electrophotographic lithograph printing plate material of the present invention exhibits high sensitivity to semiconductor laser rays and maintains excellent stability in sensitivity over a long time and thus is useful for producing a lithograph printing plate capable of making clear prints free from ground stain.

The electrophotographic lithograph printing plate material of the present invention allows the printing plate-making process to be controlled by a digital computer, and thus a computer-to-plate type printing plate-making process is commercially possible.

I claim:

1. A laser-sensitive electrophotographic lithograph printing plate material comprising:
    a substrate and
    a laser-sensitive photoconductive layer formed on a surface of the substrate and comprising a mixture of a finely divided photoconductive zinc oxide and an electrically insulating binder,
    said photoconductive layer further comprising (1) a sensitizing dye comprising at least one compound of the formula (I):

$$\text{(I)}$$

wherein $R^1$ and $R^2$ respectively and independently from each other represent a member selected from the group consisting of —CH$_3$, —C$_2$H$_5$, and —CH$_2$—CH=CH$_2$ groups and X represents a halogen atom, and (2) an antioxidant comprising at least one member selected from the group consisting of 2,6-di-tert-butyl-p-cresol, 2,2'-methylene-bis (4-methyl-6-tert-butylphenol), dilaurylthiopropionate, nonylphenylphosphite and N-phenylnapthylamine.

2. The lithograph printing plate material as claimed in claim 1, wherein the sensitizing dye is present in an amount of 0.001% to 0.5% based on the weight of the photoconductive zinc oxide.

3. The lithograph printing plate material as claimed in claim 1, wherein the antioxidant is present in an amount of 0.001% to 0.5% based on the weight of the photoconductive zinc pigment.

4. The lithograph printing plate material as claimed in claim 1, wherein the electrically insulating binder comprises at least one member selected from the group consisting of acrylic acid ester copolymers, methacrylic acid ester copolymers, vinyl acetate copolymers, silicone resins, and polyvinyl butyral resins.

5. The lithograph printing plate material as claimed in claim 1, wherein the electrically insulating binder is present in an amount of 10 to 30% based on the weight of the photoconductive zinc pigment.

6. The lithograph printing plate material as claimed in claim 1, further comprising an intermediate layer formed between the substrate and the photoconductive layer.

* * * * *